US009962906B1

(12) United States Patent
Maguire et al.

(10) Patent No.: US 9,962,906 B1
(45) Date of Patent: May 8, 2018

(54) ANTI-STICK EASY-RELEASE CONVEYOR BELTS

(71) Applicant: ContiTech Transportbandsysteme GmbH, Hannover (DE)

(72) Inventors: David J. Maguire, Hudson, OH (US); Thomas George Burrowes, North Canton, OH (US); Guangzhuo Rong, Medina, OH (US)

(73) Assignee: ContiTech Transportbandsysteme GmbH, Hannover (DE)

( * ) Notice: Subject to any disclaimer, the term of this patent is extended or adjusted under 35 U.S.C. 154(b) by 0 days. days.

(21) Appl. No.: 15/373,940

(22) Filed: Dec. 9, 2016

(51) Int. Cl.
| | |
|---|---|
| B65G 15/34 | (2006.01) |
| B32B 7/06 | (2006.01) |
| B65G 15/36 | (2006.01) |
| B32B 37/14 | (2006.01) |
| B29D 29/06 | (2006.01) |
| B32B 27/32 | (2006.01) |
| B29C 43/24 | (2006.01) |
| B29K 23/00 | (2006.01) |

(52) U.S. Cl.
CPC .............. *B32B 7/06* (2013.01); *B29D 29/06* (2013.01); *B32B 37/144* (2013.01); *B65G 15/36* (2013.01); *B29C 43/24* (2013.01); *B29K 2023/0683* (2013.01); *B32B 27/32* (2013.01); *B32B 2305/18* (2013.01); *B32B 2317/22* (2013.01); *B32B 2319/00* (2013.01)

(58) Field of Classification Search
CPC ...................................... B65G 15/34
USPC ........................................ 198/847
See application file for complete search history.

(56) References Cited

U.S. PATENT DOCUMENTS

| | | | |
|---|---|---|---|
| 4,507,418 A | | 3/1985 | Utsunomiya et al. |
| 4,674,622 A | * | 6/1987 | Utsunomiya ........... B32B 25/10 |
| | | | 198/500 |
| 6,994,210 B2 | | 2/2006 | Kerwel et al. |
| 7,371,446 B2 | | 5/2008 | Kerstetter, III et al. |
| 7,842,354 B2 | | 11/2010 | Wood et al. |
| 8,007,917 B2 | * | 8/2011 | Alexander .............. B32B 25/14 |
| | | | 198/844.1 |
| 8,030,404 B2 | | 10/2011 | Burrowes et al. |

(Continued)

OTHER PUBLICATIONS

International Search Report dated Feb. 18, 2018 of international application PCT/EP2017/079317.

*Primary Examiner* — James R Bidwell
(74) *Attorney, Agent, or Firm* — David L. Cate

(57) ABSTRACT

A conveyor belt includes a cover layer defining a load carrying surface, a pulley engaging layer disposed parallel to the cover layer, and a carcass containing a reinforcement layer, where the carcass disposed between the cover layer and the pulley engaging layer. The cover layer is formed by curing an admixture containing at least a cross-linkable functionalized polyethylene and polyethylene polyolefin. According to the disclosure, the cured admixture is effectively maintained within the cover layer during use of the conveyor belt. In some cases, the load carrying surface maintains a wet clay cleanability value of greater than 3, or even a wet clay cleanability value of greater than 4.4. The cross-linkable functionalized polyethylene may be a cross-linkable oxidized polyethylene. In some aspects, the cross-linkable functionalized polyethylene does not form a polyethylene film upon the load carrying surface.

10 Claims, 4 Drawing Sheets

(56) References Cited

U.S. PATENT DOCUMENTS

| | | | |
|---|---|---|---|
| 8,910,780 B2 | 12/2014 | Pero et al. | |
| 2004/0065529 A1* | 4/2004 | Cediel | B65G 15/32 |
| | | | 198/847 |
| 2004/0140180 A1 | 7/2004 | Kerwel et al. | |
| 2006/0148989 A1 | 7/2006 | Burrowes et al. | |
| 2006/0287148 A1 | 12/2006 | Wood et al. | |
| 2008/0116043 A1* | 5/2008 | Chahal | B32B 5/28 |
| | | | 198/847 |
| 2010/0190914 A1 | 7/2010 | Burrowes et al. | |
| 2012/0031742 A1* | 2/2012 | Nakano | B29D 29/06 |
| | | | 198/847 |
| 2012/0168285 A1* | 7/2012 | Holland | B65G 15/34 |
| | | | 198/847 |
| 2014/0021021 A1* | 1/2014 | Pero | B65G 15/34 |
| | | | 198/847 |
| 2015/0225175 A1* | 8/2015 | Borio | C08L 23/0869 |
| | | | 198/835 |
| 2016/0137421 A1* | 5/2016 | Josserond | B65G 15/34 |
| | | | 474/139 |
| 2016/0152805 A1 | 6/2016 | Jasiunas et al. | |
| 2017/0190511 A1* | 7/2017 | Takahashi | B65G 15/42 |

\* cited by examiner

ANTI-STICK EASY-RELEASE CONVEYOR BELTS

FIELD

The field to which the disclosure generally relates is rubber articles with anti-stick and/or easy-release covers which prevent materials from building up on the outer covers, as well as methods of manufacturing such rubber articles.

BACKGROUND

This section provides background information to facilitate a better understanding of the various aspects of the disclosure. It should be understood that the statements in this section of this document are to be read in this light, and not as admissions of prior art.

Some conventional conveyor belts which are used in heavy duty applications are typically comprised of a cured rubber or polyvinyl chloride (PVC) based material as a top layer, a cured rubber or PVC based material as a bottom layer, and a reinforcement layer (a carcass) having a warp and weft, disposed between the top layer and the bottom layer. The cured rubber or polyvinyl chloride based material may also serve to adhere various components of the reinforcement layer. For example, individual layers and reinforcing elements included in the carcass may be encapsulated in a matrix of polymeric elastomeric resin. The individual layers are saturated with the liquid elastomer-forming polymeric resin prior to being joined together, and the reinforcing elements may be inserted, for example, by tufting, sewing, or stitch-bonding. In cases where the liquid saturate is a polyvinylchloride plastisol, the resin is gelled, or otherwise cured, by application of heat. In cases where cured rubber is used, the reinforcing elements may be entrained in a bonding rubber layer, and cured along with the top layer and the bottom layer.

Oxidized polyethylenes are known and are taught by U.S. Pat. Nos. 2,683,141 and 3,060,163 to Erchak. They are used to form stable, translucent emulsions for use in floor waxes, in coatings for asbestos shingles, paper and textiles, and in inks for application to various surfaces. They have been incorporated into thermoplastic polypropylene compositions containing EPDM compositions, such as those described in U.S. Pat. No. 4,990,568 to Benefield et al. In Benefield a thermoplastic polypropylene is modified with EPM or EPDM and an oxidized or carboxylated polyolefin, in at an amount of 2 to 20% of the elastomer, to improve the problem of adherence of coatings applied to the surfaces of articles formed from the thermoplastic elastomers.

The use of mechanical cleaning systems for conveyor belts is known. For example, there are belt scrapers which are applied especially in the region of the direction-changing rollers. The disadvantage of such belt scrapers is that premature wear of the belt cover is caused during the scraping operation by the direct contact of the scraper and the rubber cover. Because severe heavy duty belt scrapers have been shown to be unsatisfactory, it has been suggested to provide conveyor belts with dirt-repelling cover layers.

Some conveyor belts use a coating of plastic or polymer to prevent the build-up and dirtying of conveyor belts during the transport of the most different goods, especially mass goods. Some of these conveyor belts have a load carrying surface with coating or film of polyethylene, to provide anti-adhesive effect. However, an inadequate ability to bend the belt conveyor coated with polyethylene has been shown.

Additionally, coatings or films applied to the outer surface of cover layers for rubber articles, such as hoses, conveyor belts, power transmission belts, and the like, are prone to delamination or erosion from the cover surface during the usable service like of the article, thereby losing the resistance to baking-on, dirtying or otherwise accumulation of material on the cover.

Thus, there is an ongoing need for rubber articles, such as conveyor belts, formed of materials which provide high durability, improved anti-stick and/or easy-release properties for their covers, while not being detrimental to other useful belt properties (i.e. abrasion resistance, troughability level, etc), such need met, at least in part, with embodiments according to the following disclosure.

SUMMARY

This section provides a general summary of the disclosure, and is not a necessarily a comprehensive disclosure of its full scope or all of its features.

In a first aspect of the disclosure, a conveyor belt includes a cover layer defining a load carrying surface, a pulley engaging layer disposed parallel to the cover layer, and a carcass containing one or more reinforcement layers, which may include multiple fabric plies and/or steel cords, where the carcass disposed between the cover layer and the pulley engaging layer. The cover layer is formed by curing an admixture containing at least a cross-linkable functionalized polyethylene and polyethylene polyolefin. According to the disclosure, the cured admixture is effectively maintained within the cover layer during use of the conveyor belt. In some cases, the load carrying surface maintains a wet clay cleanability value of greater than 3, or even a wet clay cleanability value of greater than 4.4.

The cross-linkable functionalized polyethylene may be a cross-linkable oxidized high density polyethylene or a cross-linkable maleated high density polyethylene, in some embodiments. In some other cases, the cross-linkable functionalized polyethylene may be a cross-linkable oxidized low density polyethylene or a cross-linkable maleated low density polyethylene, in some embodiments. Further, the cross-linkable functionalized polyethylene may be incorporated in an amount of about 5% to about 80% by weight of the admixture. The cross-linkable functionalized polyethylene and the polyethylene polyolefin may be present in the admixture at a weight ratio in a range of from about 1:10 to about 10:1. In some aspects, the cross-linkable functionalized polyethylene does not form a polyethylene film upon the load carrying surface.

In another aspect of the disclosure, a rubber article includes a cover layer defining an outer surface, and a carcass including one or more reinforcement layers, where the carcass disposed inward from the cover layer. The cover layer is formed by curing an admixture containing at least a cross-linkable functionalized polyethylene and EPDM/EPM, and the cured admixture is effectively maintained within the cover layer during use of the rubber article. In some cases, the outer surface has a wet clay cleanability value of greater than 3, or even a wet clay cleanability value of greater than 4.4.

Yet other aspects of the disclosure are methods of preparing a conveyor belt by providing a carcass containing one or more reinforcement layers, where the carcass defines a first side and an opposing second side. A cover layer is applied to the first side, and the cover layer defines a load carrying surface. A pulley engaging layer is applied to the opposing second side of the carcass. The combination of the carcass, the cover layer and the pulley engaging layer is then cured. The cover layer is formed from an admixture containing a cross-linkable functionalized polyethylene and polyethylene polyolefin. The cured admixture is effectively maintained within the cover layer during use of the conveyor belt, and the load carrying surface has a wet clay cleanability value of greater than 3 during the use of the conveyor belt.

BRIEF DESCRIPTION OF THE DRAWINGS

Certain embodiments of the disclosure will hereafter be described with reference to the accompanying drawings, wherein like reference numerals denote like elements. It should be understood, however, that the accompanying figures illustrate the various implementations described herein and are not meant to limit the scope of various technologies described herein, and.

DETAILED DESCRIPTION

Figure 1:
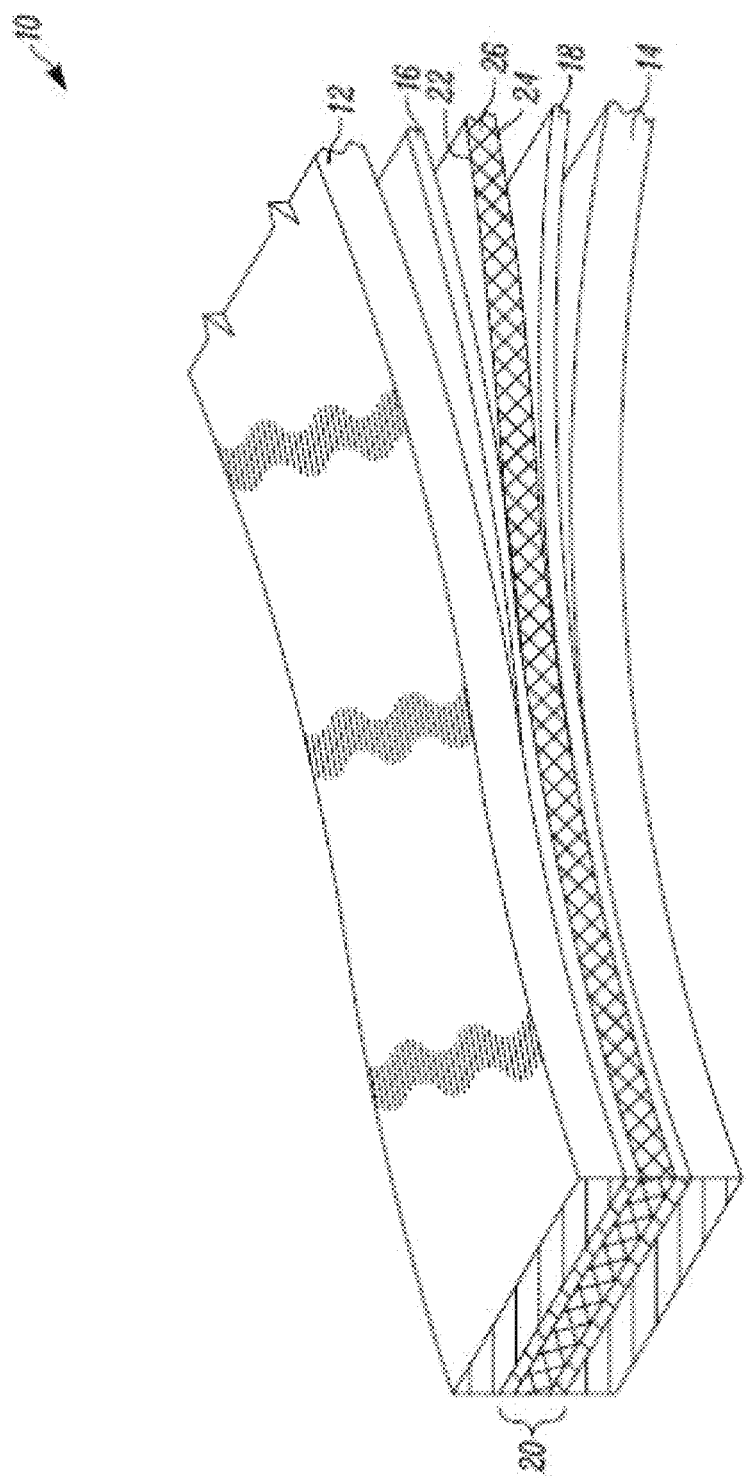
FIG. 1 illustrates in a perspective view, a portion of a conveyor belt where layers are peeled apart, according to an aspect of the disclosure.

The following description of the variations is merely illustrative in nature and is in no way intended to limit the scope of the disclosure, its application, or uses. The description and examples are presented herein solely for the purpose of illustrating the various embodiments of the disclosure and should not be construed as a limitation to the scope and applicability of the disclosure. While the compositions of the present disclosure are described herein as comprising certain materials, it should be understood that the composition could optionally comprise two or more chemically different materials. In addition, the composition can also comprise some components other than the ones already cited. In the summary of the disclosure and this detailed description, each numerical value should be read once as modified by the term "about" (unless already expressly so modified), and then read again as not so modified unless otherwise indicated in context. Also, in the summary of the disclosure and this detailed description, it should be understood that a concentration or amount range or dimension listed or described as being useful, suitable, or the like, is intended that any and every concentration or amount or dimension within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific, it is to be understood that inventors appreciate and understand that any and all data points within the range are to be considered to have been specified, and that inventors had possession of the entire range and all points within the range.

Unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of concepts according to the disclosure. This description should be read to include one or at least one and the singular also includes the plural unless otherwise stated.

The terminology and phraseology used herein is for descriptive purposes and should not be construed as limiting in scope. Language such as "including," "comprising," "having," "containing," or "involving," and variations thereof, is intended to be broad and encompass the subject matter listed thereafter, equivalents, and additional subject matter not recited.

Also, as used herein any references to "one embodiment" or "an embodiment" means that a particular element, feature, structure, or characteristic described in connection with the embodiment is included in at least one embodiment. The appearances of the phrase "in one embodiment" in various places in the specification are not necessarily referring to the same embodiment.

Some embodiments of the disclosure are rubber articles, such as conveyor belts which include an elastomeric body having a cover layer defining a load carrying surface, a parallel pulley engaging layer, and a reinforcement layer, which may contain layered fabrics or single layer of parallel steel cables, and which is part of a carcass disposed within the elastomeric body of the belt. The cover layer incorporates effective level of cross-linkable functionalized polyethylene in polyethylene polyolefin which are co-vulcanized or peroxide cured together as a cross-linked polymer system. The functionalized polyethylene allows "sticky" materials such as wet clay or gypsum to not adhere to the cover, or if there is some degree of adherence of the materials, the cover layer has the characteristics to be easily cleaned of the sticky materials.

The improved cleanability allows use of "soft" scrapers to promote belt life, and the cleanability characteristics remain during the useable life of the articles, since the compositional design of the articles provides non-depleting cleanability, by avoiding use of so called "surface bloom" additives to provide cleanability. Furthermore, embodiments of the disclosure may be highly abrasion resistant, which in turn may extend useable life, and resists roughening by abrasive materials (e.g. gypsum), which further increases sticking & cleaning difficulty. Additionally, embodiments of the disclosure exhibit no or minimal compromises in physical properties, processing, and inter layer adhesion.

In accordance with the disclosure, reacting the cross-linkable functionalized polyethylene and polyethylene polyolefin, together constituting the cover layer polymer system, during the curing of the cover layer, provides a cured polymer system where the polyethylene and polyethylene polyolefin are effectively maintained within the cover layer during the usable life of the rubber product. By 'effectively maintained' it is meant that these components remain in the cured cover layer and provide sufficient anti-stick properties in the use of the rubber product. Such approach is different from a so called 'bloom' approach where anti-stick components exude from the cover layer during the use of the rubber product, which may in some cases, deplete the anti-stick properties of the usable lifetime of the product. Furthermore, the cross-linkable functionalized polyethylene does not form a film upon the load carrying surface, but rather, is entrained in the cured polymer matrix forming the cover layer According to some aspects of the disclosure, conveyor belts are provided with an anti-stick surface which is essentially permanent and resistant to wear. The anti-stick surface has a self-cleaning action (i.e. repellent) so that use of heavy-duty belt damaging scrapers is not necessarily required. As belt scrapers are always necessary embodiments according to the disclosure enable use of light duty "mild" scrapers which have less damaging effect on the belt covers, and may enable conveyed material to be removed more easily. The anti-stick surface of the conveyor belts of the disclosure have been shown to be advantageous for the most different goods to be conveyed. The anti-sticking action of the functionalized polyethylene material may, in some aspects, be further enhanced by an ultra smooth surface.

The anti-stick surface according to the disclosure, may also lead to a reduction of cleaning costs. A reduction of the acquisition costs and a lengthening of the service time may result because a use of heavy-duty scrapers is unnecessary. Bacteria and other infectious germs cannot settle permanently on the anti-adhering surface of the conveyor belt. In this way, the risk of sickness is reduced, for example, in the recycling industry and in compost facilities. Further, conveyor belts having the anti-sticking surface can be advantageously used in the many different areas of application, for example, in recycling, in composting, in the lime sandstone industry, gypsum industry, coal industry, and the like. Some additional benefits of utilizing the load carrying layers having an anti-stick surface provided by inclusion of the functionalized polyethylene in the load carrying layer include, but are not necessarily limited to:

1. Anti-adhesive characteristics which lead to the situation that moist goods to be conveyed such as gypsum, clay or titanium dioxide no longer adhere, and with this effect, a scraper can be entirely omitted or can be replaced by significantly gentler brushes or rubber bars, whereas normal rubber conveyor belts wear rapidly because of strongly acting scraping systems; and,
2. Wear resistance/service time of conveyor belts since the service life is significantly lengthened because as load carrying layer containing functionalized polyethylene is more abrasion resistant than standard rubber materials.

In some aspects, the cover layer contains polyethylene polyolefin, which may be copolymers composed of ethylene and propylene units (EPM), ethylene and butene units, ethylene and pentene units, or ethylene and octene units (EOM), and terpolymers composed of ethylene and propylene units and an unsaturated component (EPDM), as well as mixtures thereof. In some cases, when EPDM is utilized, the unsaturated component of EPDM may be any appropriate non-conjugated diene may be used, including for example, 1,4-hexadiene (HD), dicyclopentadiene (DCPD) or ethylidenenorbornene (ENB). The ethylene-alpha-olefin elastomer may contain from about by 20% by weight to about 90% by weight of the ethylene unit, from about 80% weight to about 10% by weight of the propylene or octene unit, and 0 to about 10% by weight of the unsaturated component. In an embodiment, the ethylene-alpha-olefin elastomer contains from about 45% to about 78% by weight of the ethylene unit, or even from about 50% to about 75% of the ethylene unit. In some aspects, a blend of polyethylene polyolefins is used. At these ethylene unit content levels, endless belts and other rubber products incorporating as their outer layer portions the ethylene-alpha-olefin elastomeric compositions exhibit improved anti-stick, and/or easy release characteristics.

For purposes of this disclosure, the "total crosslinkable material" in the compositions is used as the basis for the "parts per hundred rubber" (phr) calculation. The quantity of cross-linkable functionalized polyethylene in the compound is included in the phr amount. Cross-linkable material is herein defined as a material in a composition that chemically links with other material within the composition. For the purpose of this definition, co-agents and curatives, such as peroxide, zinc methacrylate, zinc diacrylate, bis-maleimide, and/or vulcanizate are not considered cross-linkable materials. Cross-linkable materials include conventional solid elastomers, liquid elastomers, and cross-linkable thermoplastic resins or waxes.

Any of a variety of natural or synthetic elastomeric materials suitable for conveyor belt applications may be used to form the pulley engaging layer, and optional intermediate layer(s), including, but not limited to those material described in as used in belts disclosed in U.S. Pat. No. 8,910,780 B2, which is incorporated herein by reference thereto. A non-limiting list of exemplary materials includes chloro-sulfonyl-polyethylene, natural rubber, chloroprene, nitrile-butadiene rubber, butadiene rubber, isoprene, styrene-butadiene, modified polysiloxanes, polyester urethane, polyether urethane, polyvinyl chloride, fluorocarbon polymers, polyolefin, such as polyethylene or polypropylene, and the like.

The elastomeric materials used in forming conveyor belts in accordance with the disclosure may also include additives for enhancing flame retardancy, wear and chunk resistance, rolling resistance, aging resistance (e.g., ozone and UV resistance), and the like. Vulcanization aids, cross-linking agents, silicone oils, slip agents, accelerators, or other formation aids may also be used. In an aspect of the disclosure, the hydrophobicity of the load carrying cover, and hence the release properties with regard to wet materials are significantly increased with addition of silicone oil, for example, AK 12500 Silicone Fluid available from Wacker Chemie AG. In some aspects, additional enhancement of release properties may be attained with addition of slip agents/lubricants, for example, oleamide (Struktol® TR121) and stearamide (Struktol® TR141), both available from Struktol Company of America.

In accordance with the disclosure, cover layers which form and define the load carrying surface further include functionalized polyethylene incorporated in an amount of about 1% to about 99%, about 5% to about 95%, about 5 to about 80%, about 15% to about 70%, or even about 15% to about 35%, by weight of cross-linkable functionalized polyethylene forming the matrix of the cover layer. When the composition is cured by the peroxide that is included in the mixture, the functionalized polyethylene is also cross-linked into the composition, and the result is an improved composition where the functionalized polyethylene does not bloom or otherwise exude from the cover layer. Some non-limiting examples of suitable functionalized polyethylene materials include those based upon ultra-high-molecular-weight polyethylene (UHMWPE), ultra-low-molecular-weight polyethylene (ULMWPE or PE-WAX), high-molecular-weight polyethylene (HMWPE), high-density polyethylene (HDPE), high-density cross-linked polyethylene (HDXLPE), cross-linked polyethylene (PEX or XLPE), medium-density polyethylene (MDPE), linear low-density polyethylene (LLDPE), low-density polyethylene (LDPE), very-low-density polyethylene (VLDPE), and the like, which are functionalized.

Any suitable functionalized polyethylene may be used, and some examples include polyethylene which is oxidized, and polyethylene functionalized with maleate esters. In some aspects of the disclosure, the functionalized polyethylenes employed include oxidized polyethylenes and copolymers of polyethylene, such as ethylene maleic anhydride and ethylene-vinyl acetate copolymers, which will crosslink with the elastomer to increase the hardness, modulus, and abrasion resistance of the compound, which in turn, leads to improved belt properties. Some functionalized polyethylenes include oxidized polyethylene, ethylene-vinyl acetate copolymer, and ethylene maleic anhydride copolymer. Non-limiting examples of functionalized polyethylenes are available from Honeywell International Inc. under the brand name A-C® polyethylene, including A-C® 307, 307A, 395, 395A, and 629, which are oxidized polyethylenes, A-C® 400 and 400A, which are ethylene-vinyl acetate copolymers, and A-C® 575P and 575A, which are ethylene-maleic anhydride copolymers.

Oxidized polyethylene wax materials suitable for use in the practice of some embodiments of the disclosure are described in U.S. Pat. Nos. 2,683,141 and 3,060,163, which are incorporated herein by reference. According to the latter patent, normally solid, hard, waxy polymers of ethylene having an average molecular weight between about 1,000 and 3,000 are subjected, in the liquid phase, to the action of an oxygen-containing gas to cause reaction of between 2-17 pounds of oxygen per 100 pounds of wax, i.e. to provide an oxidized polyethylene wax containing at least 1 percent and preferably 1-8 percent by weight of oxygen, and acid numbers of not more than about 50, and preferably between 10 and 45.

In some aspects, the oxidized polyethylene is characterized by having a minimum number average molecular weight above 1000 and preferably at least about 1200, as determined by high temperature vapor pressure osmometry, containing between about 1 to about 5 percent by weight of total oxygen, and having an acid number of from 10 to about 35. The described oxidized polyethylene is obtained by oxidation of polyethylene in molten or finely divided solid form, with free oxygen containing gas, usually air, generally at elevated temperature, until the desired oxygen content is obtained. Starting materials for making the oxidized polyethylene suitable for include low molecular weight, low density or linear low density polyethylene waxes having specific gravities in the range of about 0.91 to about 0.96 as, for example, prepared by the process described in U.S. Pat. No. 2,683,141, as well as high density, linear polyethylene as, for example, prepared in the presence of such well know catalysts as the "Phillips" or "Ziegler" type catalysts, having specific gravities in the range of about 0.93-0.97 or above. The low molecular weight, low density polyethylene starting material can be oxidized by contacting in the molten state with a stream of air until the desired oxygen content has been obtained. The high density, linear polyethylene starting material is usually oxidized by contact, preferably in the finely divided solid state, with free oxygen-containing gas, usually air, at temperatures ranging from 100° C. up to, but not including, the crystalline melting point of the polyethylene, until the desired oxygen content has been obtained.

The compositions useful in forming the cover layers in some embodiments of the disclosure may further include from about 1 to about 250 phr, or even from about 10 to about 70 phr, of fillers such as carbon black, calcium carbonate, talc, clay or hydrated silica, or mixtures of the foregoing.

The free-radical producing curatives useful in some aspects of the disclosure are those suitable for curing polyethylene polyolefins and include for example, organic peroxides and ionizing radiation. The preferred curative is an organic peroxide, including but not limited to dicumyl peroxide, bis-(t-butyl peroxy-diisopropyl benzene, t-butyl perbenzoate, di-t-butyl peroxide, 2,5-dimethyl-2,5-di-t-bu-tylperoxyhexane, alpha-alpha-bis(t-butyl peroxy) diisopropylbenzene. The preferred organic peroxide curative is alpha-alpha-bis(t-butylperoxy)diisopropylbenzene. Cure-effective amounts of organic peroxide for purposes of the disclosure are typically from about 0.5 to about 15 phr. Some useful levels of organic peroxide are from about 1 to about 12 phr. Sulfur may optionally be added to the organic peroxide curative as part of a mixed cure system in an amount of from about 0.01 to about 1.0 phr, to improve the cured elastomer's Young's modulus without negatively affecting its tear resistance.

Other conventional polyethylene polyolefin elastomer additives, process and extender oils, antioxidants, waxes, pigments, plasticizers, softeners and the like may be added according to common rubber processing practice without departing from the disclosure. For example, in some embodiments, the elastomeric composition also contains from about 0.5 to about 1.5 phr of an antiozonant or antioxidant and from about 5 to about 15 phr of a paraffinic petroleum oil plasticizer/softener.

The polyethylene polyolefin elastomeric and functionalized polyethylene containing compositions may be prepared by any conventional procedure such as for example, by mixing and milling the ingredients in an internal mixer or mill. It should be noted that in blending some of the functionalized polyethylenes, attaining temperatures above the melting point of the polyethylene grade may be necessary to achieve processing of the mixed materials, and thus a uniform blend.

According to some aspects of the disclosure, cover layers of rubber products have the following composition prior to curing: polyethylene polyolefin (such as EPM/EPDM elastomer) in an amount of about 99 to about 20% by weight of the total cross-linkable material; cross-linkable functionalized polyethylene in an amount of from about 1 to about 80%, or even 5 to 70% by weight of the total crosslinkable material; carbon black: 5 to 100 phr, or even 15 to 60 phr; electrically conductive carbon black: 0 to 15 phr, or even 5 to 10 phr; antioxidant: 0 to 8 phr, or even 1.5 to 3 phr; organic peroxide: 0.5 to 15 phr, or even 1 to 12 phr; curing coagent: 0.5 to 10 phr, or even 1 to 8 phr; plasticizer: 0 to 20 phr, or even preferable: 1 to 10 phr.

Functionalized polyethylene may be incorporated into mixtures useful in accordance with the disclosure in a pre-dispersed form in some aspects, while in some other aspects the functionalized polyethylene is not pre-dispersed prior to incorporation.

Some rubber articles utilizing the functionalized polyethylene and polyethylene polyolefin in outer or cover layers, such as conveyor belts, power transmission belts, hoses, and the like, may further include a central reinforcing layer, which may be formed from any of a variety of materials, either woven or non-woven, spiraled, braided, and the like, in any desirable weight and orientation. In some cases, the reinforcing layer may be comprised of multiple individual plies separated by appropriate elastomeric or adhesive layers. Such materials may include a wide variety of synthetic and manmade fibers, including polyester, nylon, steel, aramid (e.g., Kevlar), glass, polypropylene, cellulose, wool, or others. The fibers may be multi-filament, monofilament, or staple fibers. In some embodiments, the central reinforcing layer includes multiple plies of polyester and/or nylon and/or blended woven fabrics. In some aspects, steel cable or cord may be used in the reinforcement.

In some aspects, the multiple plies are formed from fabrics continuously impregnated with a bonding agent in plastisol to form coated fabric material or with an adhesive rubber compound. In some cases, the fabric utilized may be comprised of cotton, a polyester, a nylon, or a blend thereof. For example, the polyester can be polyethylene terephthalate or polyethylene naphthalate. In some cases the polyester can be a copolyester that contains repeat units, which are derived from both terephthalic acid and isophthalic acid or dimethyl esters thereof. In such cases, the copolyester will typically contain at least about 95 weight percent terephthalic acid and up to about 5 weight percent isophthalic acid. More typically, the copolyester will contain at least about 97 weight percent terephthalic acid and up to about 3 weight percent isophthalic acid. The polyester fabric can optionally be made from polyester staple yarn to improve adhesion characteristics. The nylon fabrics that can be used in conjunction with this disclosure may be comprised of virtually any type of nylon, such as nylon-6,6, nylon-6,12, nylon-6, 10, nylon-6,9, nylon-6, nylon-11, or nylon-12. For commercial reasons, the nylon will typically be nylon-6,6 or nylon-6. In any case, where used, the fabric material will typically be a woven fabric, although non-woven fabrics may be useful as well.

In some other embodiments of the disclosure, the reinforcement layer is disposed in a carcass disposed and the cover layer and the pulley engaging layer of a convey belt. The reinforcement layer may be formed of the materials described above as well as other suitable materials. In some aspects, steel cords, brass cords, brass plated steel cords, zinc coated steel cords, other metal cords, or mixtures thereof are used as reinforcement components of the reinforcement layer.

Now with reference to FIG. 1, in an aspect of the disclosure, a conveyor belt 10 includes cover layer 12 and pulley engaging layer 14. The cover layer 12 is formed by curing an admixture of a cross-linkable functionalized polyethylene and polyethylene polyolefin, and may include other suitable materials used in cover layers. Pulley engaging layer 14 may be based upon any of a variety of natural or synthetic elastomeric materials, as well as other suitable materials used in pulley engaging layers. Such layers 12 and 14 may be attached in some cases to optional first and second skim layers 16 and 18, respectively, of reinforcement layer 20, which is situated between layers 12, 14. Outer first and second skim layers 16, 18 coat opposing surfaces 22 and 24 of reinforcing material 26 which together define reinforcement layer 20. In some aspects, the textile material may be, for example, a polyester/polyamide fabric, a polyester/polyester fabric, or a polyamide/polyamide fabric. Other materials may be substituted for, or combined with, the textile material 26, such as metal cords or wires (i.e. steel, brass or zinc coated, for example). As understood by one having ordinary skill in the art, multiple reinforcement layers 20 may be included with skim layers 16, 18, respectively, on opposing surfaces 22, 24 thereof.

The conveyor belt 10, may be assembled initially by applying the first and second skim layers 16, 18 to the opposing surfaces 22, 24 of the reinforcement material (or metal) 26 of reinforcement layer 20 by calendaring as known in the art. Next, cover layer 12 and pulley engaging layer 14 may be simultaneously (or sequentially) applied to the reinforcement layer 20 by calendering the materials forming cover layer 12 and pulley engaging layer 14 onto the respective surfaces of reinforcement layer 20. The resulting product is an unfinished, i.e., uncured, conveyor belt. Once assembled, the conveyor belt is then guided through a curing press at sufficient time, temperature and pressure. The cured conveyor belt 10 may then be cut to desired lengths for use in underground mining facilities or other material transport applications.

Figure 2:
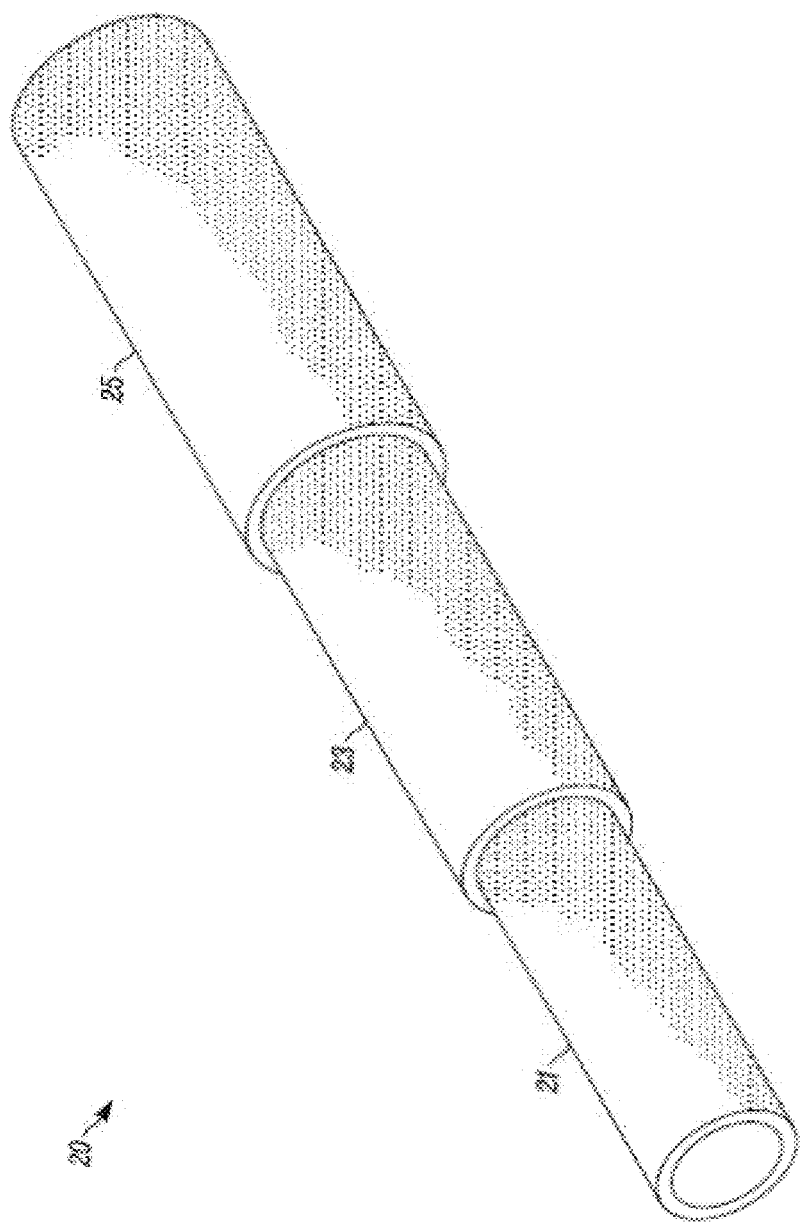
FIG. 2 depicts in a perspective view, a portion of hose where layers are tiered, according to another aspect of the disclosure; and, FIGS. 3A through 3D show objective visual standards for wet clay cleanability ratings, according to another aspect of the disclosure.
Figure 3A:
Figure 3B:
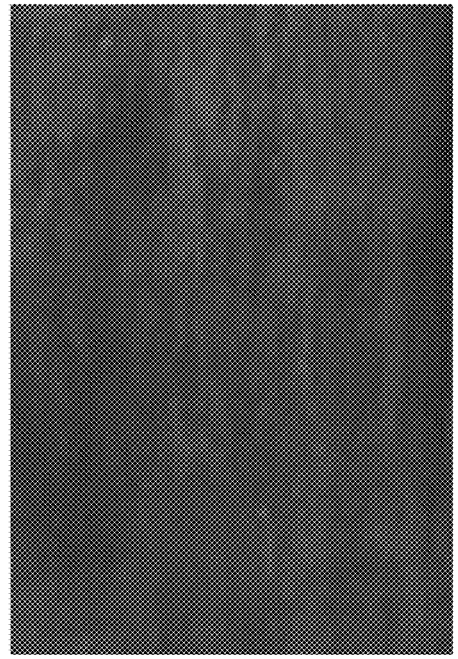
Figure 3C:
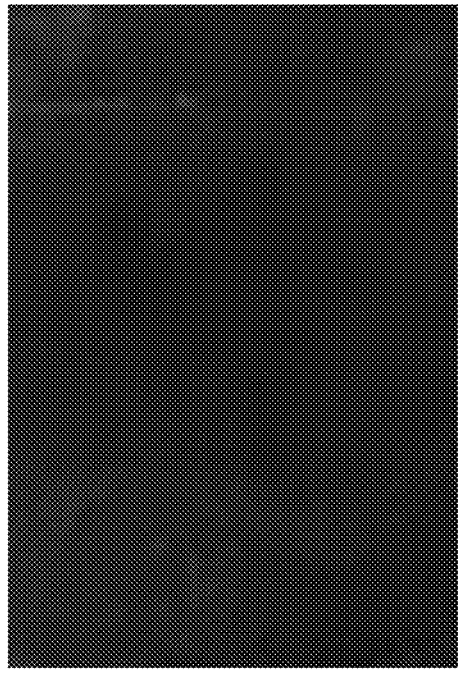
Figure 3D:
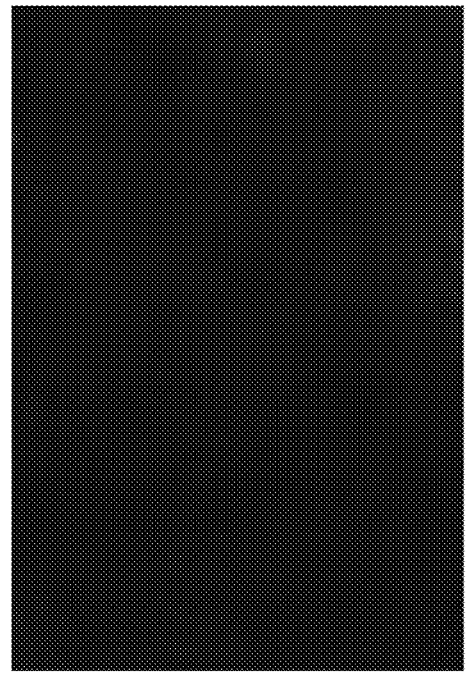

With reference to FIG. 2, in another aspect of the disclosure, a hose 10 constructed according to the disclosure is shown. The hose 10 includes an optional inner layer 21, a reinforcement layer 23 overlaying, and in some cases adhered to, the inner layer 21. Hose 10 further includes an outer cover layer 25 overlaying, and in some cases adhered to, the reinforcement layer 23. The cover layer 25 is formed by curing an admixture of a cross-linkable functionalized polyethylene and polyethylene polyolefin, and may include other suitable materials used in cover layers.

The reinforcement layer 23 is formed of a suitable reinforcement material which may include organic or inorganic fibers, steel wires, or brass-plated steel wires, and the like. The reinforcement material may be an organic fiber material, such as nylon, polyester, aramid, cotton or rayon. The reinforcement construction may be of any suitable type such as braid, spiral, knit or wrapped, but in the embodiment shown, is of a braid construction. The reinforcement may further be treated with a sizing such as an RFL-type treatment to promote adhesion between the reinforcement and the inner and outer layers. Where used, the inner layer 11 may consist of single elastomeric layers, or even multiple elastomeric layers which may or may not be of the same composition Other embodiments may be envisioned, including hose constructions having multiple reinforcement layers and multiple elastomeric layers. One or more of the elastomeric layers may comprise the compositions and construction according to the disclosure.

In addition to those hose and conveyor belt embodiments described hereinabove, any other types of rubber articles having a cover layer formed by curing an admixture of a cross-linkable functionalized polyethylene and polyethylene polyolefin to provide a surface with anti-stick and/or easy release characteristics are within the scope of this disclosure.

EXAMPLES

The following experimental data was generated for the purpose of further illustrating the nature of some of the embodiments and aspects of the disclosure, and are not intended as a limitation on the scope thereof. The following examples were prepared to illustrate improved anti-stick and/or easy release belt properties in accordance with some aspects of the disclosure.

In the following examples, in a first pass, a non-productive blend of components was mixed in an internal mixer as indicated in the tables. The non-productive batch was dropped at a temperature of from about 280 deg F. to about 290 deg F. Thereafter, in a second pass, additional components were added to non-productive blend to form a product blend by mixing in an internal mixer. The productive batch was dropped at a temperature of from about 210 deg F. to about 230 deg F. Ingredients used for these examples, comparative examples 1 and 2 (comp. ex. 1 and 2), as well as examples 1 through 42 (ex. 1-42), are provided in tables 1, 3 and 5. Where necessary, table 7 provides descriptions/availability of ingredients used in the compounding of the non-productive and productive blends.

The productive blends were then formed into 2 mm thick sheets, and cured at temperature of about 330 deg F. for 30 minutes. Physical property testing was conducted on the cured example sheets or uncured examples, with values indicated in tables 2, 4 and 6 below. Mooney scorch was conducted on a Mooney rheometer (small rotor) for uncured examples, Mooney viscosity conducted on a Mooney rheometer (large rotor) for uncured examples, and Rheometer tests conducted using a moving die rheometer for uncured examples. Tensile strength, elongation and Shore A Hardness were performed on cured example sheets according to ASTM D412. Die C Tear was performed on cured example sheets according to ASTM D624, and DIN Abrasion performed on cured example sheets according to ASTM D5963.

For the 'Wet Clay Cleanability' evaluation, a cured test example sheet and wet clay with 31.4% moisture content was placed in a rotary tumbler drum. After the drum was rotated for 3 minutes, the sheet was removed from drum. Wet clay adhered to example sheet surface was cleaned with a ceramic scraper. A rating is given based on the visual cleanness of the surface, where 5 was the best and 1 the poorest cleanability. FIGS. 3A through 3D provide objective visual standards for ratings, where FIG. 3A has a wet clay cleanability rating of 2, FIG. 3B has a wet clay cleanability rating of 3, FIG. 3C has a wet clay cleanability rating of 4.7, and FIG. 3D has a wet clay cleanability rating of 5.

As shown in the examples, in comparison with comparative examples 1 and 2, examples of embodiments according to the disclosure which are based upon functionalized polyethylene/EPDM vulcanizates (see Ex. 1 through 42) show significantly improved wet clay cleanability, and thus improved anti-stick and/or easy release properties. Comparative examples 1 and 2 had a wet clay cleanability values of 2 and 3 respectively, while examples 1 through 42 had wet clay cleanability values of 4.4 or greater. Embodiments according to the disclosure generally have wet clay cleanability values of greater than 3 and up to 5, as well as any value there between.

TABLE 1

| Ingredient | Comp. Ex. 1 | Comp. Ex. 2 | Ex. 1 | Ex. 2 | Ex. 3 | Ex. 4 | Ex. 5 | Ex. 6 | Ex. 7 |
|---|---|---|---|---|---|---|---|---|---|
| First pass | | | | | | | | | |
| Natural Rubber | 30 | 35 | 0 | 0 | 0 | 0 | 0 | 0 | 0 |
| Polybutadiene rubber A | 35 | 30 | 0 | 0 | 0 | 0 | 0 | 0 | 0 |
| Polybutadiene rubber B | 35 | 35 | 0 | 0 | 0 | 0 | 0 | 0 | 0 |
| Carbon black A | 44.5 | 55 | 0 | 0 | 0 | 0 | 0 | 0 | 0 |
| Paraffinic wax | 1.2 | 2 | 0 | 0 | 0 | 0 | 0 | 0 | 0 |
| Microcrystalline wax | 0.8 | 1.5 | 0 | 0 | 0 | 0 | 0 | 0 | 0 |
| Antioxidant | 1 | 1 | 0 | 0 | 0 | 0 | 0 | 0 | 0 |
| TMQ antioxidant | 2 | 2 | 0 | 0 | 0 | 0 | 0 | 0 | 0 |
| Antiozonant | 3 | 3 | 0 | 0 | 0 | 0 | 0 | 0 | 0 |
| Processing aid A | 1 | 0 | 0 | 0 | 0 | 0 | 0 | 0 | 0 |
| Stearic acid | 2 | 2 | 0 | 0 | 0 | 0 | 0 | 0 | 0 |
| Aromatic oil | 0 | 6 | 0 | 0 | 0 | 0 | 0 | 0 | 0 |
| Cumarone Indene Resin | 0 | 1.5 | 0 | 0 | 0 | 0 | 0 | 0 | 0 |
| Slip agent A | 0 | 4 | 0 | 0 | 0 | 0 | 0 | 0 | 0 |
| EPDM A | 0 | 0 | 50 | 80 | 80 | 0 | 76.5 | 0 | 0 |
| Oxidized HDPE/liquid EPDM blend (50/50) | 0 | 0 | 100 | 40 | 40 | 40 | 0 | 0 | 0 |
| EPDM B | 0 | 0 | 0 | 0 | 0 | 80 | 0 | 76.5 | 76.5 |
| Silicone Oil | 0 | 0 | 17 | 10 | 0 | 0 | 0 | 0 | 0 |
| Oxidized HDPE/EPDM blend (75/25) | 0 | 0 | 0 | 0 | 0 | 0 | 28 | 28 | 28 |
| Carbon black B | 0 | 0 | 35 | 35 | 35 | 35 | 25 | 15 | 15 |
| Zinc Stearate | 0 | 0 | 3 | 3 | 0 | 0 | 0 | 0 | 0 |
| Zinc Oxide | 3 | 5 | 10 | 0 | 0 | 0 | 0 | 0 | 0 |
| Processing aid B | 0 | 0 | 0 | 0 | 2 | 2 | 2 | 2 | 2 |
| Paraffinic oil | 0 | 0 | 0 | 0 | 8 | 8 | 8 | 8 | 8 |
| Slip agent B | 0 | 0 | 0 | 0 | 0 | 0 | 0 | 0 | 4 |
| Liquid EPDM A | 0 | 0 | 0 | 0 | 0 | 0 | 6.5 | 6.5 | 6.5 |
| Liquid EPDM B | 0 | 0 | 0 | 0 | 0 | 0 | 10 | 10 | 10 |
| Second pass | | | | | | | | | |
| Curative 4-iv | 1.25 | 0 | 0 | 0 | 0 | 0 | 0 | 0 | 0 |
| Accelerator A | 1.25 | 0 | 0 | 0 | 0 | 0 | 0 | 0 | 0 |
| Sulfur | 0 | 1 | 0 | 0 | 0 | 0 | 0 | 0 | 0 |
| Accelerator B | 0 | 1.1 | 0 | 0 | 0 | 0 | 0 | 0 | 0 |
| Peroxide | 0 | 0 | 4.5 | 3 | 3 | 3 | 3 | 3 | 3 |
| Processing aid B | 0 | 0 | 2 | 2 | 0 | 0 | 0 | 0 | 0 |
| Peroxide coagent (60% active) | 0 | 0 | 2.75 | 1.8 | 1.8 | 1.8 | 1.8 | 1.8 | 1.8 |
| Paraffinic oil | 0 | 0 | 0 | 8.4 | 0 | 0 | 0 | 0 | 0 |
| Silicone Oil | 0 | 0 | 0 | 0 | 10 | 10 | 10 | 10 | 10 |
| Carbon black B | 0 | 0 | 0 | 0 | 5 | 5 | 10 | 10 | 10 |
| PHR Running Total: | 165 | 185.1 | 227.25 | 174.8 | 184.8 | 184.8 | 180.8 | 170.8 | 174.8 |

TABLE 2

| Test | Comp. Ex. 1 | Comp. Ex. 2 | Ex. 1 | Ex. 2 | Ex. 3 | Ex. 4 | Ex. 5 | Ex. 6 | Ex. 7 |
|---|---|---|---|---|---|---|---|---|---|
| Physical properties | | | | | | | | | |
| Specific Gravity: | 1.0933 | 1.1219 | 1.0355 | 1.0026 | 1.0092 | 1.0092 | 1.0018 | 0.9761 | 0.9757 |
| Mooney Scorch (30 min/121 deg C.) | | | | | | | | | |
| ML | 23 | 24.6 | 9.7 | 16.75 | 15.2 | 16.5 | 12.1 | 11 | 10.2 |
| Mooney Viscosity (@100 deg C.) | | | | | | | | | |
| ML (1 + 4) | 48.71 | | 43.66 | 58.41 | 67.51 | 67.21 | 62.26 | 55.49 | 51.84 |
| Rheometer (30 min/163 deg C.) | | | | | | | | | |
| Min | 3.648 | 3.83 | 0.52 | 1.74 | 2.18 | 2.06 | 1.91 | 1.59 | 1.4 |
| Max | 25.84 | 21.73 | 13.51 | 16.64 | 21.66 | 21.97 | 18.8 | 18.05 | 16.85 |
| Tris1 | 4.88 | 5.42 | 1.76 | 0.92 | 0.81 | 0.81 | 0.94 | 0.94 | 0.98 |
| T25 | 6.56 | 7.23 | 4.39 | 2.17 | 2.22 | 2.22 | 2.29 | 2.12 | 2.16 |
| S25 | 9.188 | 8.27 | 3.77 | 5.47 | 7.05 | 7.03 | 6.12 | 5.71 | 5.24 |
| T90 | 9.63 | 10.13 | 22.9 | 16.02 | 16.63 | 16.18 | 15.64 | 15.1 | 15.95 |
| S90 | 23.62 | 19.93 | 12.2 | 15.14 | 19.72 | 19.97 | 17.1 | 16.4 | 15.3 |
| Rate | 8.06 | 6.44 | 1.05 | 2.5 | 3.07 | 3.26 | 2.73 | 3.14 | 2.87 |
| Amount | 22.2 | 17.9 | 12.99 | 14.9 | 19.48 | 19.91 | 16.89 | 16.46 | 15.45 |
| Tensile, psi | 2635 | 2500 | 1398 | 2150 | 1767 | 2517 | 1729 | 2420 | 2365 |
| Elongation, % | 599 | 687 | 279 | 494 | 420 | 465 | 505 | 518 | 546 |
| Mod 100, psi | 221 | 196 | 891 | 461 | 472 | 538 | 439 | 498 | 480 |
| Mod 300, psi | | | | 969 | | | | | |
| Shore A Hardness | 57 | 55 | 85 | 73 | 75 | 80 | 75 | 79 | 79 |
| DIN Abrasion | 69 | 52 | 237 | 101 | 111 | 88 | 75 | 42 | 43 |
| Wet Clay Cleanability (scale of 1 to 5 with 5 being best) | 2 | 3 | 5 | 4.5 | 4.5 | 4.7 | 4.5 | 4.7 | 4.7 |

TABLE 3

| Ingredient | Ex. 8 | Ex. 9 | Ex. 10 | Ex. 11 | Ex. 12 | Ex. 13 | Ex. 14 | Ex. 15 | Ex. 16 | Ex. 17 | Ex. 18 | Ex. 19 | Ex. 20 | Ex. 21 | Ex. 22 | Ex. 23 | Ex. 24 |
|---|---|---|---|---|---|---|---|---|---|---|---|---|---|---|---|---|---|
| First pass | | | | | | | | | | | | | | | | | |
| EPDM B | 70 | 60 | 50 | 40 | 50 | 50 | 60 | 60 | 60 | 60 | 60 | 60 | 50 | 60 | 50 | 60 | 50 |
| EPDM C | 30 | 40 | 50 | 60 | 0 | 0 | 40 | 40 | 40 | 40 | 40 | 40 | 50 | 40 | 50 | 40 | 50 |
| Oxidized HDPE | 30 | 30 | 30 | 30 | 20 | 20 | 30 | 30 | 30 | 30 | 30 | 30 | 30 | 25 | 25 | 20 | 20 |
| EPDM D | 0 | 0 | 0 | 0 | 50 | 50 | 0 | 0 | 0 | 0 | 0 | 0 | 0 | 0 | 0 | 0 | 0 |
| Carbon black B | 17.5 | 17.5 | 17.5 | 17.5 | 17.5 | 17.5 | 17.5 | 17.5 | 17.5 | 22.5 | 25 | 17.5 | 17.5 | 17.5 | 17.5 | 17.5 | 17.5 |
| Paraffinic oil | 8 | 8 | 8 | 8 | 8 | 8 | 8 | 8 | 8 | 8 | 8 | 8 | 8 | 8 | 8 | 8 | 8 |
| Slip agent B | 8 | 8 | 8 | 8 | 8 | 8 | 8 | 8 | 8 | 8 | 8 | 8 | 8 | 8 | 8 | 8 | 8 |
| Second pass | | | | | | | | | | | | | | | | | |
| Peroxide | 3 | 3 | 3 | 3 | 3 | 3 | 3 | 3 | 3 | 3 | 3 | 3 | 3 | 3 | 3 | 3 | 3 |
| Peroxide coagent (72% active) | 1.8 | 1.8 | 1.8 | 1.8 | 1.8 | 1.8 | 1.8 | 1.8 | 1.8 | 1.8 | 1.8 | 1.8 | 1.8 | 1.8 | 1.8 | 1.8 | 1.8 |
| Silicone oil | 10 | 10 | 10 | 10 | 10 | 0 | 10 | 0 | 10 | 0 | 0 | 10 | 10 | 10 | 10 | 10 | 10 |
| Carbon black B | 7.5 | 7.5 | 7.5 | 7.5 | 7.5 | 5 | 7.5 | 5 | 7.5 | 0 | 0 | 7.5 | 7.5 | 7.5 | 7.5 | 7.5 | 7.5 |
| Silicone oil dispersion (80%) | 0 | 0 | 0 | 0 | 0 | 12.5 | 0 | 12.5 | 0 | 12.5 | 12.5 | 0 | 0 | 0 | 0 | 0 | 0 |
| PHR Running Total: | 185.8 | 185.8 | 185.8 | 185.8 | 175.8 | 175.8 | 185.8 | 185.8 | 185.8 | 185.8 | 188.3 | 185.8 | 185.8 | 180.8 | 180.8 | 175.8 | 175.8 |

TABLE 4

| Test | Ex. 8 | Ex. 9 | Ex. 10 | Ex. 11 | Ex. 12 | Ex. 13 | Ex. 14 | Ex. 15 | Ex. 16 | Ex. 17 |
|---|---|---|---|---|---|---|---|---|---|---|
| Physical properties | | | | | | | | | | |
| Specific Gravity: | 0.9593 | 0.9586 | 0.9579 | 0.9573 | 0.9637 | 0.9675 | 0.9586 | 0.9622 | 0.9581 | 0.9617 |
| Mooney Scorch (30 min /121 deg C.) | | | | | | | | | | |
| ML | 18.5 | 14.8 | 12.6 | 8.8 | 15.8 | 17 | 14.7 | 15.6 | 15.1 | 15 |
| t5 | 27.95 | 23.37 | 24.54 | | | | | | 19.44 | 20.49 |
| Mooney Viscosity (@100 deg C.) | | | | | | | | | | |
| ML (1 + 4) | 24.66 | 40.1 | 36.51 | 29.47 | 33.34 | 47.83 | 39.59 | 46.79 | 38.02 | 41.63 |
| Rheometer (30 min/163 deg C.) | | | | | | | | | | |
| Min | 0.95 | 0.75 | 0.55 | 0.41 | 1.29 | 1.29 | 0.75 | 0.75 | 0.77 | 0.74 |
| Max | 14.61 | 13.06 | 11.57 | 9.57 | 13.75 | 13.84 | 8.95 | 8.91 | 14.6 | 14.57 |
| Tris1 | 1.25 | 1.4 | 1.57 | 1.91 | 1.37 | 1.41 | 1.97 | 2.1 | 1.33 | 2.58 |
| T25 | 2.44 | 2.55 | 2.67 | 2.88 | 3.05 | 3.14 | 3.37 | 3.54 | 2.54 | 2.58 |
| S25 | 4.38 | 3.82 | 3.3 | 2.69 | 4.41 | 4.43 | 2.8 | 2.79 | 4.22 | 4.2 |
| T90 | 17.73 | 18.33 | 18.89 | 19.52 | 19.02 | 19.06 | 19.77 | 19.84 | 18.67 | 19.08 |
| S90 | 13.23 | 11.82 | 10.48 | 8.64 | 12.51 | 12.58 | 8.12 | 8.1 | 13.2 | 13.18 |
| Rate | 2.36 | 2.03 | 1.78 | 1.41 | 1.33 | 1.28 | 0.8 | 0.76 | 2.28 | 2.28 |
| Amount | 13.66 | 12.31 | 11.02 | 9.16 | 12.46 | 12.55 | 8.2 | 8.16 | 13.83 | 13.83 |
| Tensile, psi | 2306 | 1807 | 1620 | 1498 | 2502 | 2575 | 2064 | 1765 | 2065 | 2299 |
| Elongation, % | 590 | 580 | 598 | 645 | 709 | 693 | 739 | 706 | 634 | 624 |
| Mod 100, psi | 519 | 509 | 485 | 476 | 412 | 430 | 479 | 467 | 471 | 493 |
| Mod 300, psi | 833 | 799 | 728 | 673 | 656 | 687 | 689 | 653 | 733 | 750 |
| Shore A Hardness | 79 | 77 | 77 | 76 | 73 | 73 | 77 | 75 | 78 | 77 |
| Tear Test | | | | | | | | | | |
| Die C Tear, lbf/inch | 262 | 262 | 245 | 241 | 269 | 275 | 277 | 270 | 275 | 282 |
| DIN Abrasion | 51 | 55 | 56 | 61 | 47 | 50 | 51 | 53 | 44 | 48 |
| Wet Clay Cleanability (scale of 1 to 5 with 5 being best) | 4.7 | 4.7 | 4.5 | 4.5 | 4.5 | 4.5 | 4.7 | 4.7 | 4.7 | 4.7 |

| Test | Ex. 18 | Ex. 19 | Ex. 20 | Ex. 21 | Ex. 22 | Ex. 23 | Ex. 24 |
|---|---|---|---|---|---|---|---|
| Physical properties | | | | | | | |
| Specific Gravity: | 0.9677 | 0.9586 | 0.9579 | 0.9597 | 0.959 | 0.9609 | 0.9602 |
| Mooney Scorch (30 min /121 deg C.) | | | | | | | |
| ML | 16.1 | 14.96 | 12.35 | 13.63 | 11.54 | 12.39 | 10.7 |
| t5 | 20.63 | 25.22 | 23.2 | 23.44 | | 27.13 | |
| Mooney Viscosity (@100 deg C.) | | | | | | | |
| ML (1 + 4) | 42.82 | 40.07 | 36.67 | 37.44 | 33.26 | 36.33 | 30.28 |
| Rheometer (30 min/163 deg C.) | | | | | | | |
| Min | 0.76 | 0.7 | 0.55 | 0.76 | 0.58 | 0.82 | 0.63 |
| Max | 14.81 | 12.97 | 11.11 | 13.6 | 12.25 | 14.97 | 13.13 |
| Tris1 | 1.34 | 1.39 | 1.65 | 1.34 | 1.5 | 1.2 | 1.41 |
| T25 | 2.6 | 2.53 | 2.71 | 2.5 | 2.6 | 2.38 | 2.55 |
| S25 | 4.27 | 3.76 | 3.17 | 3.97 | 3.49 | 4.35 | 3.74 |
| T90 | 19.04 | 18.62 | 19.18 | 18.48 | 18.98 | 18.15 | 18.74 |
| S90 | 13.39 | 11.74 | 10.05 | 12.32 | 11.09 | 13.54 | 11.9 |
| Rate | 2.29 | 2.03 | 1.71 | 2.2 | 1.93 | 2.48 | 2.12 |
| Amount | 14.05 | 12.27 | 10.56 | 12.84 | 11.67 | 14.15 | 12.5 |
| Tensile, psi | 2138 | 2277 | 1948 | 2315 | 1597 | 2035 | 1932 |
| Elongation, % | 609 | 623 | 652 | 608 | 584 | 558 | 614 |
| Mod 100, psi | 488 | 523 | 500 | 468 | 457 | 425 | 399 |
| Mod 300, psi | 773 | 792 | 735 | 758 | 706 | 758 | 667 |
| Shore A Hardness | 79 | 81 | 81 | 79 | 77 | 75 | 75 |
| Tear Test | | | | | | | |
| Die C Tear, lbf/inch | 283 | 269 | 262 | 254 | 236 | 226 | 221 |
| DIN Abrasion | 51 | 45 | 44 | 47 | 51 | 49 | 53 |
| Wet Clay Cleanability (scale of 1 to 5 with 5 being best) | 4.7 | 4.7 | 4.5 | 4.6 | 4.5 | 4.6 | 4.5 |

TABLE 5

| Ingredient | Ex. 25 | Ex. 26 | Ex. 27 | Ex. 28 | Ex. 29 | Ex. 30 | Ex. 31 | Ex. 32 | Ex. 33 | Ex. 34 |
|---|---|---|---|---|---|---|---|---|---|---|
| *First pass* | | | | | | | | | | |
| EPDM A | 30 | 0 | 0 | 0 | 0 | 0 | 0 | 0 | 0 | 0 |
| EPDM B | 46.5 | 46.5 | 76.5 | 46.5 | 80 | 76.5 | 76.5 | 76.5 | 46.5 | 46.5 |
| EPDM E | 0 | 30 | 0 | 30 | 0 | 0 | 0 | 0 | 0 | 0 |
| EPDM D | 0 | 0 | 0 | 0 | 0 | 0 | 0 | 0 | 46.5 | 46.5 |
| Oxidized HDPE/EPDM blend (75/25) | 28 | 28 | 28 | 28 | 0 | 28 | 28 | 28 | 28 | 28 |
| Carbon black B | 15 | 15 | 15 | 15 | 17.5 | 17.5 | 17.5 | 17.5 | 17.5 | 0 |
| Carbon black C | 0 | 0 | 0 | 0 | 0 | 0 | 0 | 0 | 0 | 17.5 |
| Oxidized HDPE | 0 | 0 | 0 | 0 | 21 | 0 | 0 | 0 | 0 | 0 |
| Paraffinic oil | 8 | 8 | 8 | 8 | 8 | 8 | 8 | 8 | 8 | 8 |
| Slip agent B | 0 | 0 | 8 | 8 | 8 | 8 | 8 | 8 | 8 | 8 |
| Processing aid B | 2 | 2 | 2 | 2 | 2 | 2 | 2 | 2 | 0 | 0 |
| Liquid EPDM A | 6.5 | 6.5 | 6.5 | 6.5 | 20 | 16.5 | 6.5 | 6.5 | 0 | 0 |
| Liquid EPDM B | 10 | 10 | 10 | 10 | 0 | 0 | 10 | 10 | 0 | 0 |
| *Second pass* | | | | | | | | | | |
| Peroxide | 3 | 3 | 3 | 3 | 3 | 3 | 3 | 3 | 3 | 3 |
| Peroxide coagent (72% active) | 1.8 | 1.8 | 1.8 | 1.8 | 1.8 | 1.8 | 1.8 | 1.8 | 1.8 | 1.8 |
| Silicone oil | 10 | 10 | 10 | 10 | 10 | 10 | 10 | 10 | 10 | 10 |
| Silicone oil dispersion (70%) | 0 | 0 | 0 | 0 | 0 | 0 | 0 | 0 | 0 | 0 |
| Carbon black B | 10 | 10 | 10 | 10 | 7.5 | 7.5 | 7.5 | 7.5 | 7.5 | 0 |
| Carbon black C | 0 | 0 | 0 | 0 | 0 | 0 | 0 | 0 | 0 | 7.5 |
| PHR Running Total: | 170.8 | 170.8 | 178.8 | 178.8 | 178.8 | 178.8 | 178.8 | 178.8 | 176.8 | 176.8 |

| Ingredient | Ex. 35 | Ex. 36 | Ex. 37 | Ex. 38 | Ex. 39 | Ex. 40 | Ex. 41 | Ex. 42 |
|---|---|---|---|---|---|---|---|---|
| *First pass* | | | | | | | | |
| EPDM A | 0 | 0 | 0 | 0 | 0 | 0 | 0 | 0 |
| EPDM B | 46.5 | 46.5 | 50 | 50 | 50 | 50 | 50 | 50 |
| EPDM E | 0 | 0 | 0 | 0 | 0 | 0 | 0 | 0 |
| EPDM D | 46.5 | 46.5 | 50 | 50 | 50 | 50 | 50 | 50 |
| Oxidized HDPE/EPDM blend (75/25) | 28 | 28 | 0 | 0 | 0 | 0 | 0 | 0 |
| Carbon black B | 17.5 | 25 | 17.5 | 25 | 17.5 | 20 | 20 | 20 |
| Carbon black C | 0 | 0 | 0 | 0 | 0 | 0 | 0 | 0 |
| Oxidized HDPE | 0 | 0 | 20 | 20 | 20 | 20 | 20 | 20 |
| Paraffinic oil | 8 | 8 | 8 | 8 | 8 | 8 | 8 | 8 |
| Slip agent B | 8 | 8 | 8 | 8 | 8 | 8 | 8 | 8 |
| Processing aid B | 0 | 0 | 0 | 0 | 0 | 0 | 0 | 0 |
| Liquid EPDM A | 0 | 0 | 0 | 0 | 0 | 0 | 0 | 0 |
| Liquid EPDM B | 0 | 0 | 0 | 0 | 0 | 0 | 0 | 0 |
| *Second pass* | | | | | | | | |
| Peroxide | 3 | 3 | 3 | 3 | 3 | 3 | 3 | 3 |
| Peroxide coagent (72% active) | 1.8 | 1.8 | 1.8 | 1.8 | 1.8 | 1.8 | 1.8 | 1.8 |
| Silicone oil | 10 | 10 | 10 | 10 | 10 | 5 | 0 | 0 |
| Silicone oil dispersion (70%) | 0 | 15 | 0 | 15 | 0 | 0 | 14 | 20 |
| Carbon black B | 7.5 | 0 | 7.5 | 0 | 7.5 | 5 | 5 | 5 |
| Carbon black C | 0 | 0 | 0 | 0 | 0 | 0 | 0 | 0 |
| PHR Running Total: | 176.8 | 181.8 | 175.8 | 180.8 | 175.8 | 170.8 | 179.8 | 185.8 |

TABLE 6

| Test | Ex. 25 | Ex. 26 | Ex. 27 | Ex. 28 | Ex. 29 | Ex. 30 | Ex. 31 | Ex. 32 | Ex. 33 |
|---|---|---|---|---|---|---|---|---|---|
| Physical properties | | | | | | | | | |
| Specific Gravity: | 0.9761 | 0.9761 | 0.9754 | 0.9754 | 0.9794 | 0.9841 | 0.9754 | 0.9754 | 0.9709 |
| Mooney Scorch (30 min/121 deg C.) | | | | | | | | | |
| ML t5 | 11.7 | 10.1 | 10 | 8.4 | 12.2 | 11.2 | 11.4 | 10.9 | 11.4 |
| Mooney Viscosity (@100 deg C.) | | | | | | | | | |
| ML (1 + 4) | 55.57 | 46.88 | 46.07 | 35.94 | 47.84 | 48.79 | 47.11 | 47.63 | 43.42 |
| Rheometer (30 min/163 deg C.) | | | | | | | | | |
| Min | 1.62 | 1.15 | 1.26 | 0.89 | 1.27 | 1.29 | 1.26 | 1.3 | 1.32 |
| Max | 17.95 | 18.2 | 15.32 | 14.94 | 15.6 | 15.62 | 14.59 | 14.56 | 18.31 |
| Tris1 | 0.93 | 1.01 | 1.05 | 1.19 | 1.04 | 1.06 | 1.08 | 1.1 | 1.05 |
| T25 | 2.11 | 2.32 | 2.16 | 2.41 | 2.17 | 2.22 | 2.21 | 2.2 | 2.43 |
| S25 | 5.7 | 5.41 | 4.75 | 4.4 | 4.86 | 4.88 | 4.61 | 4.62 | 5.56 |
| T90 | 15.65 | 16.44 | 16.15 | 16.89 | 16.2 | 16.43 | 15.56 | 15.48 | 17.58 |
| S90 | 16.32 | 16.49 | 13.89 | 13.53 | 14.17 | 14.18 | 13.26 | 13.25 | 16.61 |
| Rate | 3.03 | 2.92 | 2.63 | 2.36 | 2.64 | 2.56 | 2.44 | 2.45 | 2.78 |
| Amount | 16.33 | 17.05 | 14.06 | 14.05 | 14.33 | 14.33 | 13.33 | 13.26 | 16.99 |
| Tensile, psi | 2115 | 1796 | 2480 | 2043 | 2573 | 2328 | 2307 | 2123 | 1880 |
| Elongation, % | 498 | 446 | 580 | 551 | 566 | 568 | 612 | 588 | 518 |
| Mod 100, psi | 446 | 469 | 460 | 446 | 475 | 465 | 418 | 431 | 427 |
| Mod 300, psi | 920 | 973 | 836 | 786 | 857 | 844 | 725 | 738 | 781 |
| Shore A Hardness | 74 | 75 | 77 | 77 | 80 | 80 | 76 | 76 | 74 |
| Tear Test - Original | | | | | | | | | |
| Die C Tear, lbf/inch | | | | | | | 234 | 233 | 217 |
| DIN Abrasion | 56 | 49 | 47 | 49 | 48 | 48 | 50 | 48 | 58 |
| Wet Clay Cleanability (scale of 1 to 5 with 5 being best) | 4.5 | 4.7 | 4.7 | 4.7 | 4.7 | 4.7 | 4.7 | 4.7 | 4.5 |

| Test | Ex. 34 | Ex. 35 | Ex. 36 | Ex. 37 | Ex. 38 | Ex. 39 | Ex. 40 | Ex. 41 | Ex. 42 |
|---|---|---|---|---|---|---|---|---|---|
| Physical properties | | | | | | | | | |
| Specific Gravity: | 0.9709 | 0.9709 | 0.9829 | 0.9637 | 0.9759 | 0.9637 | 0.9635 | 0.9751 | 0.9797 |
| Mooney Scorch (30min/121 deg C.) | | | | | | | | | |
| ML t5 | 11.2 | 12.2 | 14.6 | 12 | 14.2 | 14.4 | 19.5 | 18.4 | 15.8 |
| | | | | | 29.71 | | 28.03 | 26.89 | |
| Mooney Viscosity (@100 deg C.) | | | | | | | | | |
| ML (1 + 4) | 37.03 | 39.43 | 52.94 | 42.03 | 49.53 | 46.54 | 57.98 | 54.39 | 53.06 |
| Rheometer (30 min/163 deg C.) | | | | | | | | | |
| Min | 1.18 | 1.3 | 1.32 | 1.34 | 1.37 | 1.27 | 1.35 | 1.41 | 1.47 |
| Max | 16.84 | 18.12 | 18.92 | 19.53 | 19.86 | 17.44 | 19.91 | 19.27 | 19.34 |
| Tris1 | 1.16 | 1.06 | 1.06 | 1 | 1.01 | 1.03 | 0.99 | 1.03 | 1.04 |
| T25 | 2.43 | 2.45 | 2.49 | 2.39 | 2.43 | 2.5 | 2.4 | 2.42 | 2.43 |
| S25 | 5.09 | 5.5 | 5.71 | 5.9 | 5.96 | 5.3 | 6 | 5.86 | 5.92 |
| T90 | 18.89 | 17.57 | 18.4 | 17.99 | 18.26 | 17.36 | 17.99 | 18.2 | 18.16 |
| S90 | 15.27 | 16.43 | 17.15 | 17.72 | 18.02 | 15.81 | 18.05 | 17.49 | 17.56 |
| Rate | 2.62 | 2.7 | 2.79 | 3 | 3.02 | 2.52 | 3.05 | 2.94 | 2.93 |
| Amount | 15.66 | 16.82 | 17.6 | 18.19 | 18.49 | 16.17 | 18.56 | 17.86 | 17.87 |
| Tensile, psi | 1846 | 1671 | 1903 | 2127 | 2270 | 2550 | 2084 | 2246 | 2056 |
| Elongation, % | 643 | 512 | 501 | 515 | 555 | 616 | 497 | 575 | 565 |
| Mod 100, psi | 389 | 432 | 454 | 426 | 423 | 414 | 464 | 407 | 410 |
| Mod 300, psi | 618 | 770 | 841 | 842 | 803 | 744 | 908 | 768 | 777 |
| Shore A Hardness | 72 | 74 | 75 | 75 | 74 | 73 | 76 | 74 | 73 |
| Tear Test - Original | | | | | | | | | |
| Die C Tear, lbf/inch | 203 | 206 | 218 | 202 | 206 | 213 | 218 | 213 | 206 |
| DIN Abrasion | 55 | 52 | 65 | 52 | 65 | 56 | 74 | 70 | 67 |
| Wet Clay Cleanability (scale of 1 to 5 with 5 being best) | 4.5 | 4.5 | 4.4 | 4.5 | 4.4 | 4.5 | 4.5 | 4.5 | 4.5 |

TABLE 7

| Ingredient | Description |
| --- | --- |
| Accelerator A | Santocure CBS available from Harwick Standard Distribution |
| Accelerator B | TBBS (N-tert-butyl-2-benzothiazyl sulfenamide) |
| Antioxidant | Polystay 100 available from Felix Compounds |
| Antiozonant | 6PPD |
| Carbon black A | N220 Carbon Black |
| Carbon black B | N330 Carbon Black |
| Carbon black C | N762 Carbon Black |
| Cumarone Indene Resin (72%) | KD-109 available from Akron Dispersions |
| Curative | Sulfur Curative |
| EPDM A | Vistalon ™ 6602 available from ExxonMobil |
| EPDM B | Royalene ® 529 available from Lion Elastomers LLC |
| EPDM C | Keltan ® 0500R available from ARLANXEO Netherlands B.V. |
| EPDM D | Vistalon ™ 2502 available from ExxonMobil |
| EPDM E | Keltan ® 2470 available from ARLANXEO Netherlands B.V. |
| Liquid EPDM A | Trilene ® 77 available from Lion Elastomers LLC |
| Liquid EPDM B | Trilene ® CP80 available from Lion Elastomers LLC |
| Oxidized HDPE | A-C ® 307A available from Honeywell International Inc. |
| Peroxide | Vul-Cup ® available from Arkema, Inc. 60% active |
| Peroxide coagent | Trimethylol propane trimethacrylate (TMPTMA) |
| Polybutadiene rubber A | Budene ® 1280 available from Goodyear |
| Polybutadiene rubber B | Budene ® 1208 available from Goodyear |
| Processing aid A | Struktol ® A 60 available from Struktol Company of America |
| Processing aid B | Struktol ® WB 16 available from Struktol Company of America |
| Silicone oil | AK 12500 Silicone Fluid available from Wacker Chemie AG |
| Slip agent A | Struktol ® TR121 available from Struktol Company of America |
| Slip agent B | Struktol ® TR 141 available from Struktol Company of America |
| TMQ antioxidant | Agerite ® Resin D available from Vanderbilt Chemicals |

The foregoing description of the embodiments has been provided for purposes of illustration and description. Example embodiments are provided so that this disclosure will be sufficiently thorough, and will convey the scope to those who are skilled in the art. Numerous specific details are set forth such as examples of specific components, devices, and methods, to provide a thorough understanding of embodiments of the disclosure, but are not intended to be exhaustive or to limit the disclosure. It will be appreciated that it is within the scope of the disclosure that individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Also, in some example embodiments, well-known processes, well-known device structures, and well-known technologies are not described in detail. Further, it will be readily apparent to those of skill in the art that in the design, manufacture, and operation of apparatus to achieve that described in the disclosure, variations in apparatus design, construction, condition, erosion of components, gaps between components may present, for example.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner", "adjacent", "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Although a few embodiments of the disclosure have been described in detail above, those of ordinary skill in the art will readily appreciate that many modifications are possible without materially departing from the teachings of this disclosure. Accordingly, such modifications are intended to be included within the scope of this disclosure as defined in the claims.

What is claimed is:

1. A conveyor belt comprising:
    a cover layer defining a load carrying surface;
    a pulley engaging layer disposed parallel to the cover layer; and,
    a carcass comprising one or more reinforcement layers, the carcass disposed between the cover layer and the pulley engaging layer;
 wherein the cover layer is formed by curing an admixture comprising a cross-linkable oxidized high density polyethylene or a cross-linkable maleated high density polyethylene and a polyethylene polyolefin, and wherein the cured admixture is effectively maintained within the cover layer during use of the conveyor belt.

2. The conveyor belt according to claim 1, wherein the load carrying surface has a wet clay cleanability value of greater than 3.

3. The conveyor belt according to claim 2, wherein the load carrying surface has a wet clay cleanability value of greater than 4.4.

4. The conveyor belt according to claim 1, wherein the cross-linkable functionalized polyethylene is incorporated in an amount of 10% to 20% by weight of the admixture.

5. The conveyor belt according to claim 1, the admixture further comprising silicone oil.

6. The conveyor belt according to claim 1, the admixture further comprising one or more slip agents.

7. The conveyor belt according to claim 1, wherein the cross-linkable functionalized polyethylene and the polyethylene polyolefin are present in the admixture at a weight ratio in a range of from 1:10 to 10:1.

8. The conveyor belt according to claim 1 provided the cross-linkable functionalized polyethylene does not form a polyethylene film upon the load carrying surface.

9. A method of preparing a conveyor belt, the method comprising:
 providing a carcass comprising one or more reinforcement layers, the carcass defining a first side and an opposing second side;
 applying a cover layer to the first side, the cover layer defining a load carrying surface;
 applying a pulley engaging layer to second side; and,
 curing the combination of the carcass, the cover layer and the pulley engaging layer;
wherein the cover layer is formed by curing an admixture comprising a cross-linkable functionalized polyethylene and a polyethylene polyolefin, wherein the cross-linkable functionalized polyethylene is:
 (I) a cross-linkable oxidized high density polyethylene or a cross-linkable maleated high density polyethylene; or,
 (II) a cross-linkable oxidized low density polyethylene or a cross-linkable maleated low density polyethylene; and,
wherein the cured admixture is effectively maintained within the cover layer during use of the conveyor belt, and wherein the load carrying surface has a wet clay cleanability value of greater than 3 during the use of the conveyor belt.

10. A conveyor belt comprising:
 a cover layer defining a load carrying surface;
 a pulley engaging layer disposed parallel to the cover layer; and,
 a carcass comprising one or more reinforcement layers, the carcass disposed between the cover layer and the pulley engaging layer;
wherein the cover layer is formed by curing an admixture comprising a cross-linkable oxidized low density polyethylene or a cross-linkable maleated low density polyethylene and a polyethylene polyolefin, and wherein the cured admixture is effectively maintained within the cover layer during use of the conveyor belt.

* * * * *